United States Patent [19]
Farrell et al.

[11] 3,915,614
[45] Oct. 28, 1975

[54] MOLD CLAMPING FOR INJECTION BLOW MOLDING

[75] Inventors: John J. Farrell, Green Brook; William J. Grazine, Piscataway, both of N.J.

[73] Assignee: Farrell Patent Company, Greenbrook, N.J.

[22] Filed: Aug. 29, 1974

[21] Appl. No.: 501,828

[52] U.S. Cl. .......... 425/450.1; 425/451; 425/451.2; 425/451.9; 425/DIG. 205
[51] Int. Cl.² ............................................. B29C 1/16
[58] Field of Search ..... 425/246, 450.1, 451, 451.2, 425/451.9, DIG. 205, 242 B

[56] References Cited
UNITED STATES PATENTS

| | | | |
|---|---|---|---|
| 2,689,978 | 9/1954 | Roger | 425/451.2 |
| 2,807,050 | 9/1957 | Roger | 425/450.1 |
| 3,833,333 | 9/1974 | Britten | 425/451 X |

Primary Examiner—Robert L. Spicer, Jr.
Attorney, Agent, or Firm—Marvin Feldman; J. B. Felshin

[57] ABSTRACT

This invention is an improved injection molding apparatus, and more specifically an injection blow molding machine. An injection mold and/or other molds have a movable part that is moved toward and from a fixed part to open and close the mold. Hydraulic motors supplied with high pressure liquid holds the molds closed. In order to conserve high pressure liquid, a small motor is used to open and close the molds and to move a piston of the high pressure hydraulic motor. Liquid under little or no pressure is drawn into the hydraulic motors as they are moved by the small motor. When the molds reach closed position, communication of the hydraulic motors with the low pressure liquid supply is cut off, and high pressure liquid is supplied to the hydraulic motors. The preferred construction has all of the movable parts of the molds connected with a frame and has a single small motor that moves the frame. Special motion-transmitting means maintain the frame against tilting.

20 Claims, 7 Drawing Figures

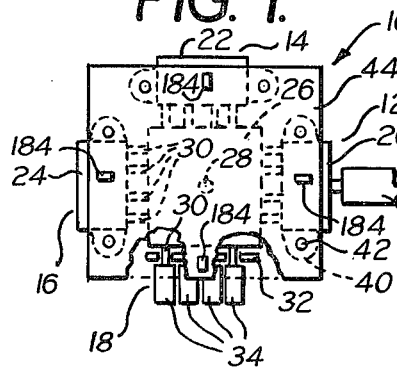
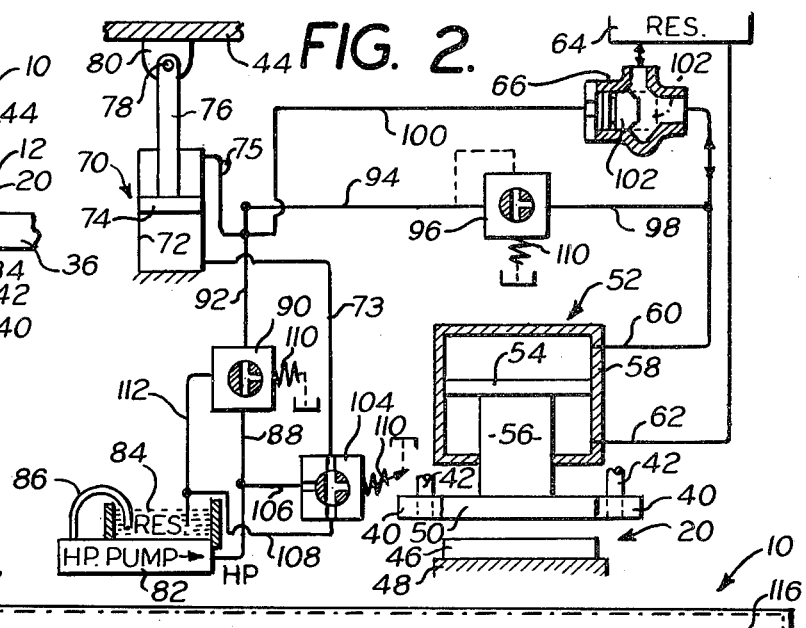
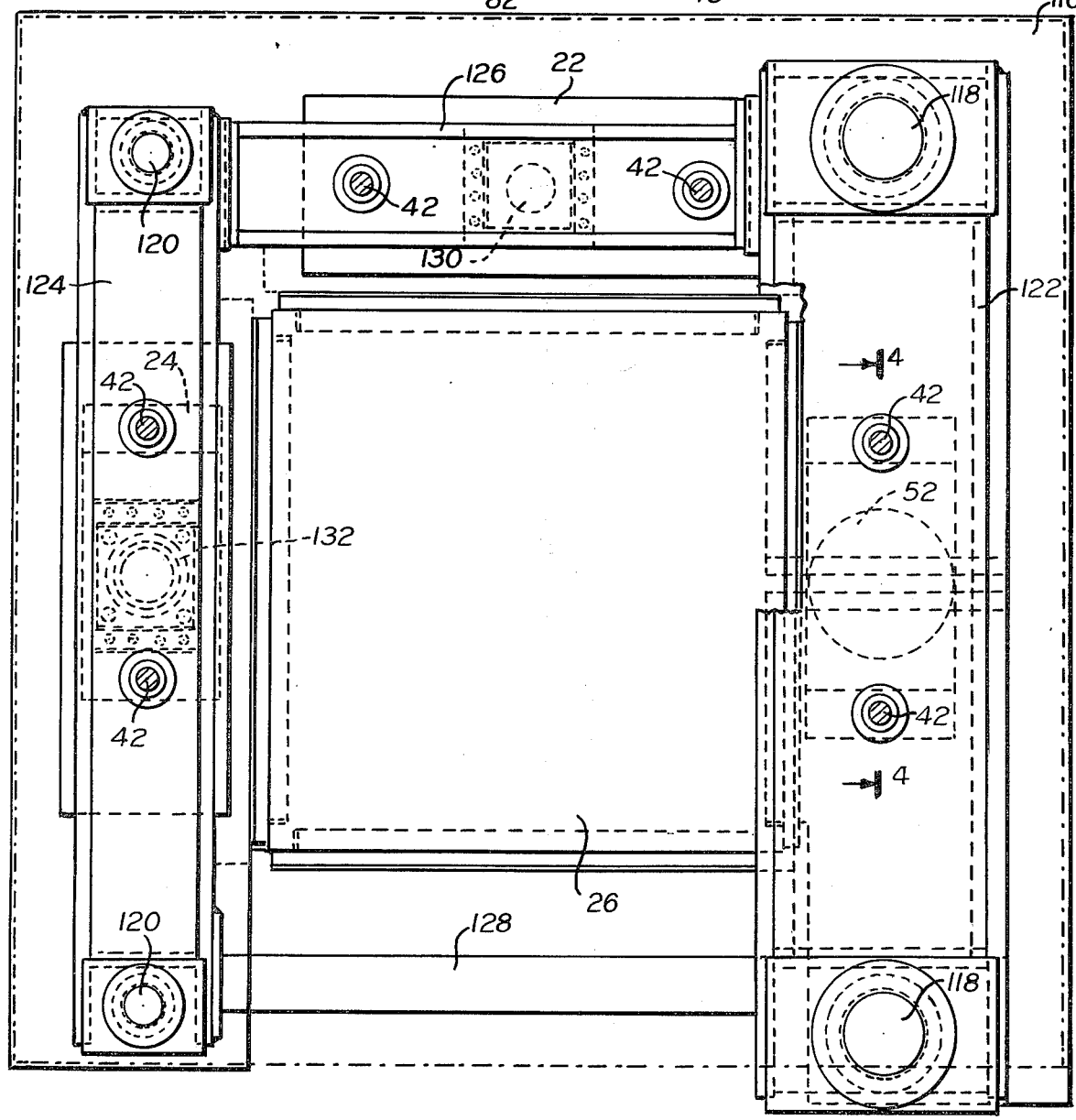

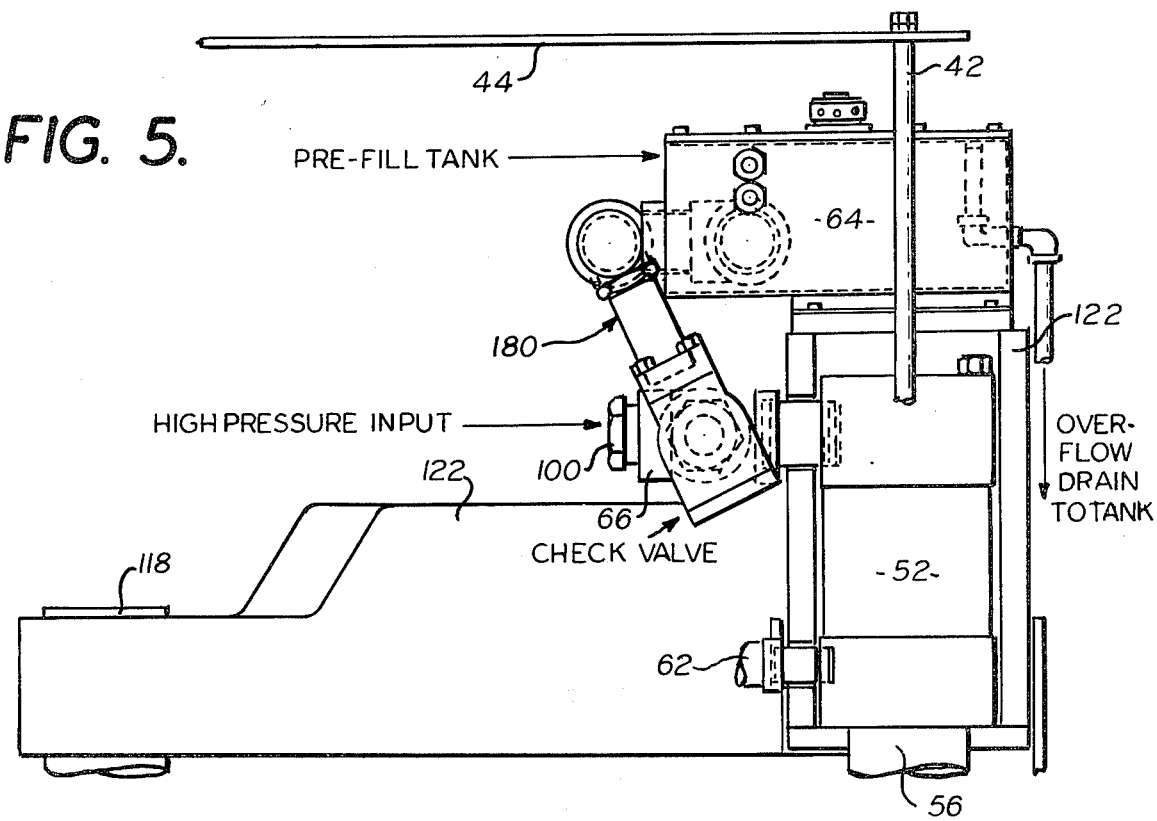
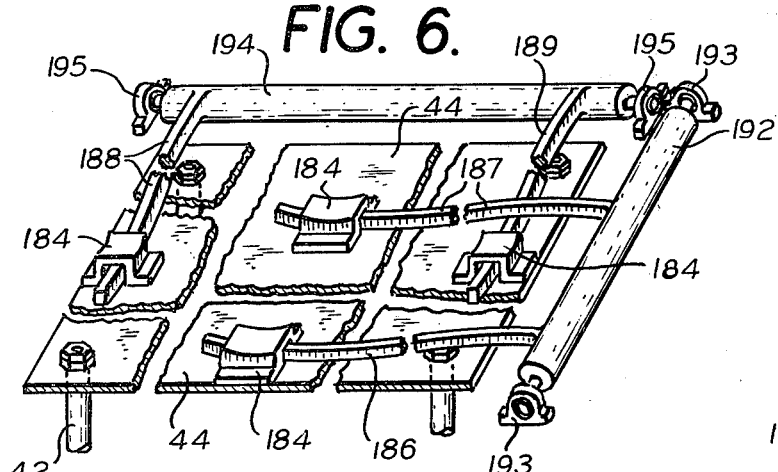
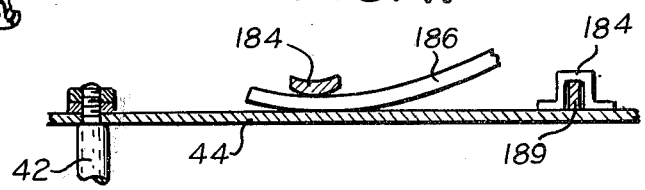

MOLD CLAMPING FOR INJECTION BLOW MOLDING

BACKGROUND AND SUMMARY OF THE INVENTION

The injection molding apparatus of this invention has one or more molds, each with a hydraulic motor for applying high pressure to maintain the molds in closed position when there is pressure in the cavities of the mold. The force required to open and close the molds is small compared to the force required to hold the molds closed when there is pressure in the cavities of the molds. This is especially true of an injection mold where the force in the cavity is produced by molten plastic which may have a pressure in excess of one thousand pounds per square inch.

In order to reduce the operating cost of the machine, it is desirable to conserve high pressure liquid required for operating the hydraulic motors to hold the molds closed. A small motor is connected with each of the hydraulic motors, but is preferably connected with all of the hydraulic motors to move these hydraulic motors during the opening and closing of the molds. The hydraulic motors draw liquid, at little or no pressure, from a reservoir during the time that the molds are being closed.

When the molds reach closed position, and high pressure becomes necessary, each hydraulic motor is cut off from its source of liquid under little or no pressure and liquid at high pressure is applied to the hydraulic motors so as to obtain all of the pressure necessary to keep the molds closed in spite of pressure in the mold cavities during injection, blowing or other operations that are performed in the respective molds.

Since the hydraulic motors are full of liquid when they reach the position where the molds are closed, and since there is little or no additional movement of the motor when the high pressure liquid is applied, the amount of high pressure liquid used is extremely small and it is not necessary to expend any substantial amount of energy in order to maintain a supply of high pressure liquid for applying the force required to maintain the molds closed. One feature of the invention relates to the construction by which a single motor of relatively small size can be connected with the movable part of each of the molds for opening and closing the molds as required. In the preferred construction the single motor is connected with a frame; and each of the movable mold parts has reach rods that extend upward to the frame and that are connected with the frame so that up and down movement of the frame lifts and lowers the movable parts of the molds.

It important to maintain the frame level; that is, to prevent tilting of the frame and binding of the bearings during the up and down movement of the frame. Special motion-transmitting connections extend from regions on opposite sides of the frame and from corresponding regions at the front and back of the frame so that these motion-transmitting means are spaced from one another in directions at right angles to one another and thereby are made responsive to tilting of the frame in any direction.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of a four-station blow molding machine made in accordance with this invention;

FIG. 2 is a diagrammatic view showing the way in which the high pressure hydraulic motors are supplied with low pressure liquid for most of the stroke and with high pressure liquid at the end of the stroke only;

FIG. 3 is a top plan view of the machine shown in FIG. 1 but with the top frame removed to illustrate the underlying structure;

FIG. 4 also shows the top frame of FIG. 1 connected with the reach rods shown in FIGS. 3 and 4;

FIG. 5 is a fragmentary and partly diagrammatic view illustrating the valve connections shown in FIG. 2 for shutting off the supply of low pressure to the hydraulic motor and supplying high pressure liquid at the end of the motor stroke;

FIG. 6 is a fragmentary diagrammatic view showing motion-transmitting connections for preventing the top frame of the machine from tilting during its up and down movement to open and close the molds; and FIG. 7 is a diagrammatic, fragmentary sectional view taken on the line 7—7 of FIG. 6.

DESCRIPTION OF PREFERRED EMBODIMENT

Figure 4:
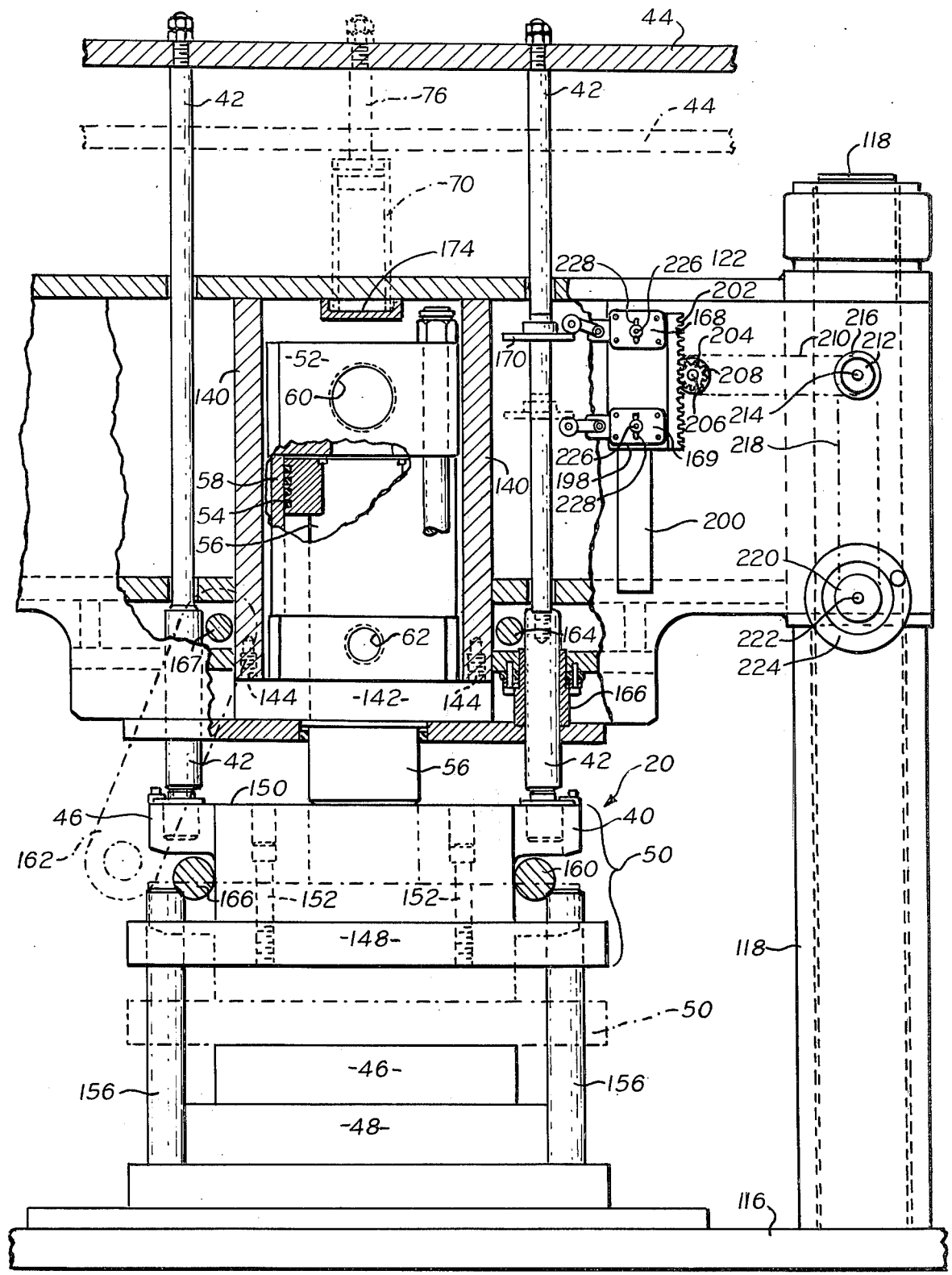
FIG. 4 is a fragmentary, vertical elevation, partly in section, showing the injection mold of the machine shown in FIG. 3, most of the section shown in FIG. 4 being on the line 4—4 of FIG. 3.

FIG. 1 shows a blow molding machine 10 which has an injection station 12, a preform station 14, a blowing station 16 and a stripper station 18. There are molds 20, 22 and 24 at the operational stations 12, 14 and 16, respectively. An indexing head 26 rotates intermittently about a center shaft 28. There are core rods 30 extending from four faces of the indexing head 26 and these faces are in 90° angular relation to one another to correspond with the relationship of the operational stations 12, 14, 16 and 18.

At the stripper station 18, a stripper 32 ejects blown articles 34 from the core rods 30 which have been delivered to the stripper station by a 90° rotation of the indexing head 26 in a counterclockwise direction in FIG. 1.

FIG. 1 also shows a plasticizer 36 from which molten plastic is injected into the injection mold 20. The construction thus far described is mostly conventional and no further detailed description of it is necessary for a complete understanding of this invention.

Each of the molds 20, 22 and 24 has lugs 40 extending from its opposite ends. A reach rod 42 is connected with each of the lugs 40 and each of the reach rods 42 extends upwardly through a frame or plate 44 at the top of the machine. The upper ends of the reach rods 42 are secured to the plate 44 so that movement of the plate 44 up and down moves the movable parts of the molds 20, 22 and 24 up and down by the same amount. The way in which the frame or plate 22 is raised and lowered will be explained in connection with FIGS. 2 and 4, and motion-transmitting means for preventing tilting of the plate 44 will be explained in connection with FIGS. 6 and 7.

FIG. 2 shows the mold 20 with a fixed part 46 attached to a platen 48 on a part of the rigid frame of the machine. The mold 20 has a movable part 50 which is shown in open position in FIG. 2. This movable part 50 has the reach rods 42 connected with lugs 40 as already described in connection with FIG. 1. These reach rods 42 raise and lower the movable mold part 50. A hydraulic motor 52 has a piston 54 and a piston rod 56 which is rigidly connected to the movable mold part 50. The piston 54 moves in a cylinder 58 and there are passages 60 and 62 leading from the upper and lower ends, respectively, of the cylinder 58.

The motor 52 is moved through its stroke by the movement of the movable mold part 50 which is actuated by the reach rods 52, in a manner which will be explained. For the present it is sufficient to understand that during the up and down movement of the piston 54, liquid is drawn from a reservoir 64 through a valve 66 leading to the passage 60 and through the passage 62 which connects directly with the reservoir 64. Thus the motor 52 is always full of liquid from the reservoir 64.

A small motor 70 has a cylinder 72, piston 74 and piston rod 76. This piston rod 76 is connected by a pin 78 to a lug 80 which is integral with the frame or plate 44.

Working fluid for moving the piston 74 in an upward direction is supplied from a passage 73 and working fluid for moving the piston 74 downward is supplied through a passage 75. In the construction illustrated, the small motor 70 is a hydraulic motor. This simplifies the supply of working fluid since it permits the same supply to be used for both the small motor 76 and the large motor 52; but the small motor 70 can be operated by compressed air or gas instead of liquid if desired.

High pressure liquid is supplied by a pump 82. This pump 82 draws liquid from a reservoir 84 through a supply pipe 86, and discharges the high pressure fluid through a passage 88 leading to a three-way valve 90.

A passage 92 connects the valve 90 with the passage 75 leading to the upper end of the small motor 70 and also with a passage 94 leading to another three-way valve 96. The three-way valve 96 has a passage 98 which connects with the passage 60 that leads from the valve 66 to the upper end of the large hydraulic motor 52. The passage 92 also connects with another passage 100 and leads to a chamber behind a valve element 102 which slides in the housing of the valve 66 from an open position, shown in full lines in FIG. 2, to a closed position shown in dotted lines. The full line position is the normal position for the valve element 102; but when substantial pressure is supplied to the chamber behind the valve element 102, the valve element, which comprises a wall of the chamber, is displaced into its closed or dotted line position.

A third three-way valve 104 is used to selectively connect the passage 73 with a branch passage 106 leading to the high pressure pump 82 and with an exhaust line 108 leading back to the reservoir 84.

The valves 90, 96 and 104 are preferably power operated and are shown with diagrammatic solenoid operating means 110 to which power is supplied as needed from control mechanism that programs the machine. Such control mechanism is conventional for obtaining desired sequences of operation of molding machines and no illustration of the actual control mechanism is necessary for a complete understanding of this invention.

In FIG. 2 the high pressure pump is delivering working fluid at high pressure through the passage 88, valve 90, and passages 92 and 74 to the small motor 70. As the piston 74 of the motor 70 moves downward, it lowers the frame or plate 44 to which the reach rods 42 are connected. This lowers the movable mold part 50 toward the fixed mold part 46 and closes the mold 20. During this downward movement of the movable mold part 50, the piston 53 of the hydraulic motor 52 draws working fluid into the top of the cylinder 58 from the reservoir 64 through the open valve 66 and passage 60. At the same time liquid under the piston 54 is pushed out through the passage 62 and up to the reservoir 64.

When the mold part 50 reaches the lower limit of its travel and is in contact with the fixed mold part 46, the pressure in the upper part of the cylinder 72 of the small motor 70 rises rapidly since the motor 70 is stalled. This increase in pressure is transmitted through the passage 100 to the chamber behind the valve element 102 and this closes the valve element 102 so that the upper end of the hydraulic motor 52 is cut off from the reservoir 64. No fluid can flow from or to the reservoir 64, from the upper end of the hydraulic motor 52, when the valve element 102 is in closed position. At the same time that the pressure increases to close the valve 66, the valve 96 is moved into position to establish communication between the passages 94 and 98 so that high pressure from the passage 92 is transmitted to the passage 60 and the large hydraulic motor 52 is subject to the high pressure from pump 82 so as to maintain a large force on the mold 20 to hold the mold closed.

This condition prevails during the injection operation and then the programming control of the molding machine operates the valves 90, 96 and 104 so as to shut off communication between the passages 94 and 98; to put the passage 92 in communication with an exhaust or drain passage 112; and to connect the high pressure pump 82, through the valve 104, with the lower end of the motor 70 so that the piston 74 will move upward and lift the frame or plate 44 to open the molds.

FIG. 3 is a simplified view of the top of the injection molding machine 10 with the top frame or plate 44 removed. The reach rods 42 are shown in section.

The machine has a base 116 and has columns extending upward from the base including two heavy columns 118 and two lighter columns 120. These columns 118 and 120 support upper frame structures 122 and 124 which are mostly channel sections with appropriate reinforcing to provide the necessary thickness.

The columns 118 and the channel 122 are heavier than the other parts of the frame because of the additional force to which the injection mold is subjected by the high pressure of the injected plastic.

A frame structure 126 connects the frame structures 122 and 124 across the top of the preform mold 22 and there is a cross brace 128 at the other side of the machine connecting the frame sections 122 and 124.

The stripper station is under the reinforcing structure 128. The indexing head 26 is shown in plan view in FIG. 3 but the core rods are omitted for clearer illustration.

The hydraulic motor 52 is shown in dotted lines in FIG. 3 and similar hydraulic motors 130 and 132 are shown over the molds 22 and 24. These hydraulic motors 130 and 132 are similar to the large motor 52 described in FIG. 2; but they are considerably smaller in diameter because the force required to hold the molds 22 and 24 closed is much less than the force required to hold the injection mold 20 closed.

FIG. 4 shows the hydraulic motor 52 located between reinforcing walls 140.

The movable mold part 50 includes a top mold section 148 secured to a platen 150 by screws 152. The lugs 40 are connected with and form part of the platen 150. The mold section 148 is guided by dowels 156. These dowels 156 extend upward from a fixed part of the mold structure and the lower fixed platen in FIG. 4.

The apparatus illustrated in FIG. 4 has safety shafts 160 which extend between arms 162, only one of which is shown in FIG. 4. However there is an arm 162 at each end of the safety shaft 160; and these arms 162 swing about supporting shafts 164 located at fixed positions with respect to the frame of the molding machine. When the mold 20 is open, the safety shafts 160 swing in under the lugs 40 so that the mold cannot be accidentally closed when someone is working on it. This safety construction is conventional on some machines and therefore no description of it is necessary in connection with the present invention.

FIG. 4 shows the reach rods 42 to be of composite construction with their lower ends slidable in bearings 166 attached to the frame of the machine.

Limit switches 168 and 169 are attached to the frame of the machine at fixed locations and are operated by a flange 170 attached to one of the reach rods 42.

FIG. 4 shows the small motor 70 in phantom since it is located ahead of the plane of section in the drawing. This small motor 70 is supported from the main frame 122 by supporting means extending across the center region of the machine; such supporting means being represented in FIG. 4 by the channel 174.

FIG. 5 shows the reservoir 64 mounted on top of the frame 122 with piping 180 connecting the reservoir 64 with the hydraulic cylinder 62. This locates the reservoir close to the hydraulic cylinder and the piping 180 is of large cross section so that liquid can be drawn into the hydraulic motor 52 and discharged therefrom on the reverse stroke with a minimum of work.

The structure shown in FIG. 5 is representative of the means for supplying liquid to the hydraulic motor 52 from a supply source located close to the motor with large cross section connecting passages. It will be understood that similar constructions can be provided for the other hydraulic motors for operating the other molds 22 and 24 (FIG. 1).

In order to make it practical to have all of the hydraulic motors moved up and down by a single small motor operating at high pressure but with limited volume because of its reduced diameter, the top frame or plate 44 must be held against tilting movement.

FIG. 6 shows motion-transmitting connections for maintaining the plate 44 level at all times. The plate has connections 184 which are shown as straps with flanges at opposite sides secured to the plate 44 in any suitable manner so as to make the connections 184 rigid with the plate 44. These connections 184 have center portions spaced from the top surface of the plate 44. FIG. 1 shows the way in which the connections 184 are located at both sides as well as at the upper and lower ends of the frame or plate 44. The connections 184 at the opposite sides are spaced from one another along a line at right angles to the line on which the upper and lower connections 184 are spaced.

Referring again to FIG. 6, there are arms 186 and 187 extending into the clearance between the raised center portion of the connections 184 at opposite ends of the plate 44; and there are other arms 188 and 189 extending into the clearance between the other connections 184 which are spaced from one another at opposite sides of the plate 44.

The arms 186 and 187 are rigidly connected with a shaft 192 which rotates about its longitudinal axis in bearings 193 at fixed locations on the main frame of the machine. This shaft 192 is rotatable but has no other movement.

The arms 188 and 189 are secured to a corresponding shaft 194 which rotates in bearings 195 at fixed locations on the frame of the machine.

If the plate 44 tends to tip down at its front edge, the connection 184 will tend to pull the arm 186 down and rotate the shaft 192 in a counterclockwise direction. This will cause the arm 187 to tend to move counterclockwise and to press down on the plate 44. Since the arms 186 and 187 are at opposite sides of the plate, one of them cannot go down at the front edge without having the opposite edge of the plate move up; but the arms 187 will not permit the other side of the plate to move up and thus the plate is held level in a fore-and-aft direction. The arms 188 and 189 operate in a similar manner to prevent tilting of the plate 44 by having one side go down and the other side come up. Thus the arms 186 and 187, extending at right angles to the arms 188 and 189, and with each pair of arms forced to move in unison, prevent any tilting of the frame or plate 44.

The arms are constructed as shown in FIG. 7, the illustration being diagrammatic. The clearance between the plate 44 and each of the connections 184 is substantially equal to the height of one of the arms, such as the arm 186 shown in FIG. 7. Since the angular position of the arms 186 with respect to the shafts to which they are connected changes as the plate 44 moves up and down, some movement of the arm 186 in the connection 187 must be provided for. However, the contacting surfaces are curved so that the height of the arm 186 will fill the clearance between the connection 187 and the top surface of the plate 44 for all positions of the arm 186, or other arms, within the working range of the plate 44.

In order to adjust the stroke of the motor 70 (FIG. 4), the limit switches 168 and 169 are mounted on a carriage 198 which is vertically movable along a fixed vertical guide 200. There is a rack 202 secured to the carriage 198. A pinion 204 meshes with the rack 202 and this pinion 204 holds the carriage in any position along the guide 200 to which the carriage is adjusted by rotation of the pinion.

The pinion 204 is secured to a shaft 206 at a fixed location on the machine, and the shaft 206 can be rotated by a sprocket 208 which is secured to the shaft 206, and which is connected by a chain 210 with an intermediate sprocket 212 on a shaft 214 with another sprocket 216.

The sprocket 216 is connected by a chain 218 with a sprocket 220 on a shaft 222 with a hand wheel 224. This hand wheel 224 is a manual control for adjusting the stroke of the motor 70. The length of the stroke can be adjusted by moving the limit switches 168 and 169 on the carriage 198 as provided for by screws 226 extending through slots 228 and connecting the limit switch housings to the carriage 198.

The preferred embodiment of the invention has been illustrated and described, but changes and modifications can be made, and some features can be used in different combinations without departing from the invention as defined in the claims.

What is claimed is:

1. Injection molding apparatus including a mold having a cavity therein, and including two parts one of which moves with respect to the other to open and close the mold, a hydraulic motor connected with the movable part of the mold and that moves as a unit with the movable part during opening and closing of the mold, a source from which relatively low pressure liquid flows to the motor during closing movement of the movable part of the mold, and means for supplying liquid at high pressure into the motor as the movable part of the mold reaches closed position to exert a substantial force on the closed mold.

2. The injection molding apparatus described in claim 1 characterized by the source from which relatively low pressure liquid is supplied to the motor including a passage for the flow of liquid, and a valve in said passage for closing the passage to back flow from the motor toward said source of relatively low pressure liquid as the mold reaches closed position.

3. The injection molding apparatus described in claim 2 characterized by the valve being a check valve constructed and arranged to open for flow of relatively low pressure liquid to the motor and that closes to prevent flow of liquid from the motor toward said source of low pressure liquid.

4. The injection molding apparatus described in claim 2 characterized by means for operating the valve including a chamber, a movable wall of said chamber and connected with the valve and oriented so that expansion of the chamber closes the valve, and a passage connecting the chamber with the means for injecting high pressure liquid into the motor and through which high pressure liquid flows to the chamber when said high pressure liquid is supplied to the motor.

5. The injection molding apparatus described in claim 1 characterized by a second motor connected with the movable part of the mold, control means for supplying working fluid to the second motor to operate the movable part and to move the hydraulic motor through a stroke as the mold closes to draw the low pressure liquid from its source and into the hydraulic motor whereby the hydraulic motor is filled with liquid when the high pressure liquid is supplied to the hydraulic motor at the end of the closing stroke of the movable part of the mold.

6. The injection molding apparatus described in claim 5 characterized by the source of relatively low pressure liquid being a reservoir in which the liquid is at substantially atmospheric pressure, the second motor being a double acting motor, and the passage from the hydraulic motor to the reservoir being open for the flow of liquid both toward and from the hydraulic motor at any time except during the application of high pressure to the hydraulic motor at the end of the closing stroke of the movable part of the mold.

7. The injection molding apparatus described in claim 6 characterized by the hydraulic motor including a cylinder and a piston that moves through a stroke in the cylinder, passages connecting the cylinder at opposite ends with the liquid reservoir so that liquid is drawn into the cylinder of the hydraulic motor when the piston moves in either direction and is ejected from the hydraulic motor to the reservoir from the end of the cylinder toward which the piston is moving during each stroke of the piston.

8. The injection molding apparatus described in claim 2 characterized by a second motor connected with the movable part of the mold, control means for supplying working fluid to the second motor to operate the movable mold part and to move the hydraulic motor through a stroke as the mold closes and while low pressure liquid is drawn from the low pressure liquid source into the hydraulic motor, pressure-operated means for closing the valve in the passage between the hydraulic motor and its source of liquid, said pressure-operated means being connected with a source of working fluid from the second motor and being operated by said working fluid that operates the second motor.

9. The injection molding apparatus described in claim 8 characterized by the pressure-operated means for closing the valve being connected with the source of working fluid for the second motor and being operated by an increase in back pressure from the second motor when the second motor completes the closing of the mold and stalls.

10. The injection molding apparatus described in claim 9 characterized by means for operating the valve including a chamber, a movable wall on one side of the chamber and connected with the valve and oriented so that expansion of the chamber closes the valve, and a passage connecting the chamber with a space that contains working fluid subject to the pressure of the working fluid in the second motor whereby the increase in working fluid in the second motor, when that motor stalls at the end of a stroke, is transmitted to the chamber of the valve for closing the valve to cut off communication between the hydraulic motor and the source of relatively low pressure liquid.

11. The injection molding apparatus described in claim 1 characterized by there being a second mold which has two parts, one of which is movable toward and from the other to open and close the second mold, a second motor which is operably connected with the movable parts of both of the molds for opening and closing the molds substantially simultaneously and for moving the hydraulic motor.

12. The injection molding apparatus described in claim 11 characterized by a second hydraulic motor connected with the movable part of the second mold for operation in unison therewith, the means for supplying liquid at high pressure to the first hydraulic motor also being connected with the second hydraulic motor for supplying high pressure thereto at the end of the closing stroke of the second mold.

13. The injection molding apparatus described in claim 12 characterized by the first mold being an injection mold of an injection blow molding apparatus, the second mold being a blowing mold, and the hydraulic motors being cylinder-and-piston motors with the diameter of the cylinder of the first hydraulic motor substantially greater than that of the second hydraulic motor whereby a higher pressure is applied to the first mold and to the second mold when the molds are closed and the hydraulic motors are subjected to pressure of the high pressure liquid.

14. The injection molding apparatus described in claim 11 characterized by the movable part of each of the molds having reach rods extending upwardly therefrom, a frame at the upper ends of each of the reach rods and to which the reach rods are connected, the second motor being connected with the frame for moving the frame and the connected mold parts in unison with the stroke of the second motor.

15. The injection molding apparatus described in claim 14 characterized by the molds being spaced from one another laterally and the reach rods extending upwardly in parallel directions to laterially spaced connections with the frame, the frame having a horizontal orientation when the movable parts of the different molds are in corresponding positions, and means for preventing the frame from moving out of its horizontal orientation including motion-transmitting connections at horizontally spaced locations on the frame for preventing vertical movement of the frame at one of said locations without corresponding movement of the frame at the other location.

16. The injection molding apparatus described in claim 15 characterized by other motion-transmitting connections at other horizontally spaced locations on the frame for preventing vertical movement of the frame at one of said other locations without corresponding movement of the frame at the second of said other location, the horizontal spacing of the first locations being at substantially right angles to the horizontal spacing of the said other horizontally spaced locations.

17. The injection molding apparatus described in claim 16 characterized by the frame having flat areas on the top surface thereof, the first motion-transmitting connections comprising substantially rigid arms extending across the upper side of said frame, straps on the frame forming recesses into which end portions of each of said arms extend with substantially no vertical clearance, a shaft to which each arm is secured for angular movement as a unit about an axis of rotation of the shaft, said other motion-transmitting connections being of similar construction to the first motion-transmitting connections and having arms secured to a second shaft that rotates about an axis extending in a direction at right angles to the axis of the first shaft and parallel to the horizontal spacing of said other motion-transmitting connections.

18. The injection molding apparatus described in claim 12 characterized by a source of relatively low pressure liquid connected with the second hydraulic motor by a passage through which the second hydraulic motor draws and exhausts relatively low pressure liquid during a complete stroke of the second hydraulic motor with each closing and opening of the second mold, the source of relatively low pressure liquid for the second hydraulic motor being different from that for the first hydraulic motor, and the source of relatively low pressure liquid for each of said hydraulic motors being a reservoir mounted on a frame of the injection molding apparatus close to and at an elevation as high as the elevation of the hydraulic motor to and from which the relatively low pressure liquid flows during movement of the hydraulic motor as the movable part of the mold is shifted toward closed and open positions.

19. The injection molds machine described in claim 5 characterized by adjustable control means for changing the stroke of the second motor.

20. The injection molding apparatus described in claim 19 characterized by said control means including an abutment that moves with the second motor, a limit switch in the path of the abutment, a manually adjustable element, and motor means between the manually adjustable element and the limit switch for moving the limit switch parallel to the direction of movement of the abutment.

* * * * *